United States Patent [19]

Blume

[11] Patent Number: 4,852,733
[45] Date of Patent: Aug. 1, 1989

[54] FLAG MOUNTING CLIPS

[76] Inventor: Dayton G. Blume, 855 Starboard Dr., Vero Beach, Fla. 32963

[21] Appl. No.: 232,623

[22] Filed: Aug. 15, 1988

[51] Int. Cl.⁴ ............................................. A44B 13/02
[52] U.S. Cl. .................................. 206/223; 24/241 S; 24/231; 24/237
[58] Field of Search ................... 24/241 S, 241 P, 231, 24/237, 241 PL; 206/223

[56] References Cited

U.S. PATENT DOCUMENTS

| | | | |
|---|---|---|---|
| 3,241,201 | 3/1966 | Atester | 24/237 |
| 3,750,240 | 8/1973 | Fridrich | 24/237 |
| 4,100,658 | 7/1978 | Nikota | 24/241 S |
| 4,372,131 | 2/1983 | Musillo | 24/241 S |

*Primary Examiner*—Joseph Man-Fu Moy
*Attorney, Agent, or Firm*—Carroll F. Palmer

[57] ABSTRACT

A clip for mounting a flag on a staff, pole or like support is formed of wire bent to define a circular coil from which a first leg and a second leg tangentially extend. The first leg is substantially straight and terminates in a hooked end. The second leg consists of first, second and third straight sections of approximately equal length. The first section extends from the coil at an acute angle and with the distance between the first section and the first leg being greater than the diameter of the coil. The second section extends from the first section at a first angle while the third section extends from the second section toward the first leg and at a second angle and terminates in a hooked end. The first and second angles are such that the hooked end of the second section may be hooked over the first leg at a point between its end and the coil with the second section positioned about normal to the first leg. The clips may be packaged in combination pairs in which the coil of one clip is slightly larger in diameter than the coil of the other clip.

6 Claims, 1 Drawing Sheet

FLAG MOUNTING CLIPS

FIELD OF THE INVENTION

This application relates to clips for mounting flags, pennants, burgees or the like on staffs, poles, antenna, halyards or the like. It also concerns a new article of manufacture comprising the packaged clips.

BACKGROUND OF THE INVENTION

Flags, pennants, burgees and like devices, which will be referred to herein collectively as flags, are usually mounted aboard ship or on land in a manner that permits them to stream freely in the wind. This typically requires attachment of the leading edge of the flag to some vertical support, e.g., a staff, pole, antenna, halyard or the like, which will be collectively referred to herein as flag support, leaving the remainder of the flag free to fly.

Flags typically have their leading edge reinforced with tape and provided with a grommet fixed in each end thereof. The grommets are used to attach the flag to a flag support by tying one end of a piece of cord to the grommet and the other end to the support. Such operations can be tedious and frustrating, particularly when a flag is mounted on a ship moving about in a rough sea, e.g., when display of the flag is used for signaling at sea.

Clips, pins and similar devices of various type have been used instead of cords to attach flags to flag supports, but such prior known devices have been deficient in their ease or universality of use. The present invention addresses the shortcomings of such prior devices and provides flag mounting clips of novel design.

It is well known to form clips, pins and the like by bending wire into a desired shape, e.g., see U.S. Pat. No. 542,803. This invention utilizes such fabrication method to create the new flag mounting clips.

OBJECTS

A principal object of this invention is the provision of clips of novel form rendering them specifically useful for mounting flags on flag supports.

Another object is the provision of such clips that make the task of flag mounting easier than has been possible in the past.

A further object is the provision of unique packaged combinations of the new clips.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished according to the invention by the provision of new forms of clips for mounting flags on a flag supports.

The new clips are formed o wire bent to define a circular coil from which a first leg and a second leg tangentially extend. The first leg is substantially straight and terminates in a hooked end.

The second leg consists of first, second and third straight, integral sections of approximately equal length and the first section extends from the coil at an acute angle with respect to the first leg and with the distance between the first section and the first leg being greater than the diameter of the coil.

The second section extends from the first section at a first angle with respect to the first section.

The third section extends from the second section toward the first leg and at a second angle with respect to the second section terminating in a hooked end.

The first and second angles are such that the hooked end of the third section may, by flexing the coil portion of the clip, be hooked over the first leg at a point between its end and the coil with the third section positioned approximately normal to the first leg.

The new clips are advantageously packaged in pairs in which the coil of one clip is slightly larger in diameter than the coil of the other clip in the pair. Such paired clips enable flags to be mounted on tapered radio antennae typically carried by motor cruisers, fishing boats, sailboats and similar craft in a unique way described below.

BRIEF DESCRIPTION OF THE DRAWINGS

A more complete understanding of the present invention may be obtained by reference to the accompanying drawings in which.

DESCRIPTION OF THE PREFERRED EMBODIMENTS

Figure 1:
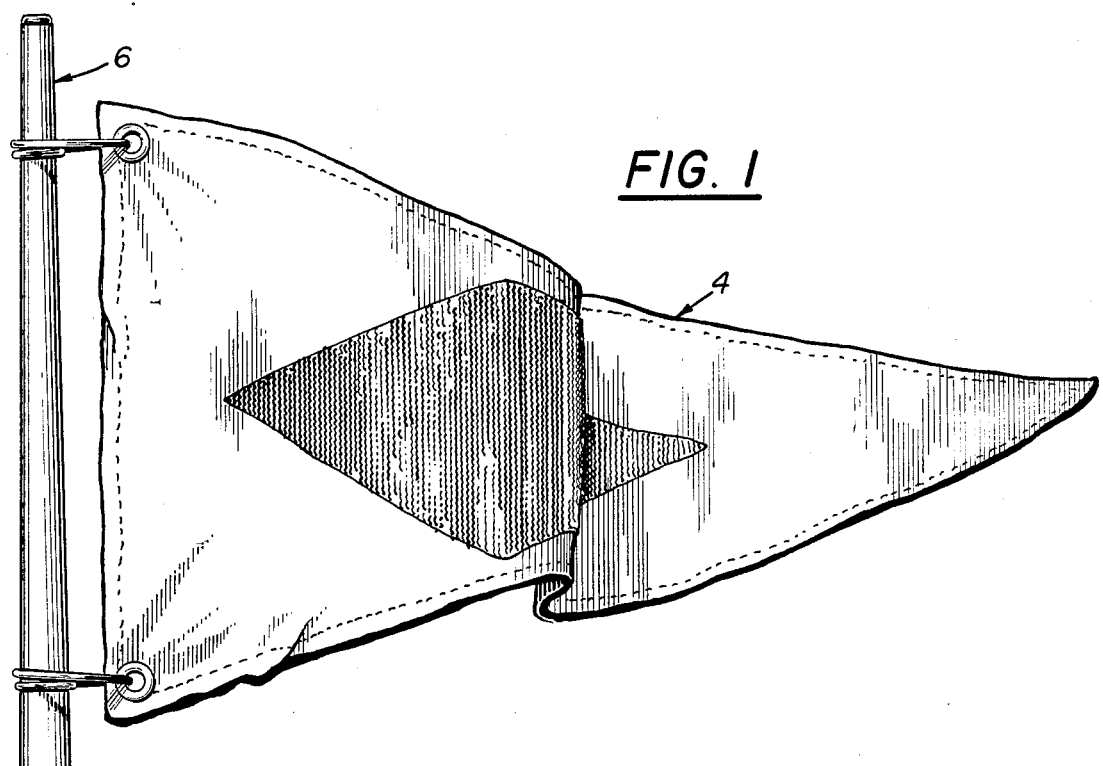
FIG. 1 is a lateral view of a flag mounted on a flag support with the aid of flag mounting clips of the invention.

The objects are, in part, accomplished according to the invention by the provision of a clip 2 for mounting a flag 4 on a flag support 6.

The clip 2 is formed of wire 8 bent to define a circular coil 10 from which a first leg 12 and a second leg 14 tangentially extend.

The first leg 12 is substantially straight and terminates in a hooked end 16.

The second leg 14 consists of integral, straight first section 18, second 20 section and third section 22 of approximately equal length with the first section 18 extending from the coil 10 at an acute angle with respect to the first leg 12.

The second section 20 extends from the first section 18 at a first angle with respect to the first section 18 and with the distance between the first section 18 and the first leg 12 being greater than the diameter of the coil 10.

The third section 22 extends from the second section 20 toward the first leg 12 are at a second angle with respect to the second section 20 terminating in a hooked end 24. The first and second angles are being such that the hooked end 24 may, by flexing of the coil 10, be hooked over the first leg 12 at a point between its end 16 and the coil 10 with the third section 22 positioned approximately normal to the first leg 12.

In a typical clip 2, the coil 10 is between about ¼ and 1 inch in diameter, the first leg 12 is between about ¾ and 2 inches in length and the second leg 14 is about 25 to 50% longer than said first leg.

Figure 2:
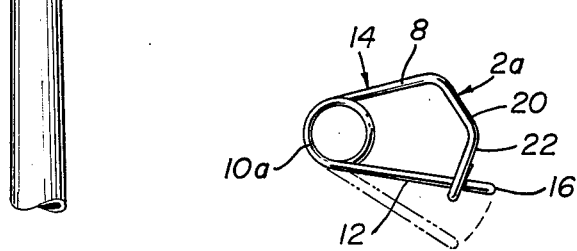
FIG. 2 is a plan view of a first flag mounting clip of the invention.
Figure 3:
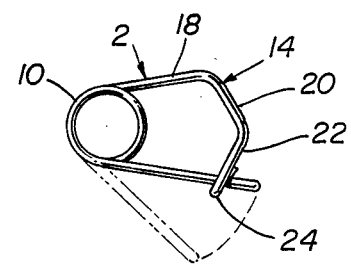
FIG. 3 is a plan view of a second flag mounting clip of the invention.

In a preferred embodiment of the invention, the clips are in the form of a first clip 2 (FIG. 3) and a second clip 2a (FIG. 2).

The second clip 2a is formed of wire bent in substantially the same shape as clip 2, but with the coil 10a thereof slightly smaller in diameter than the diameter of coil 10.

Figure 4:
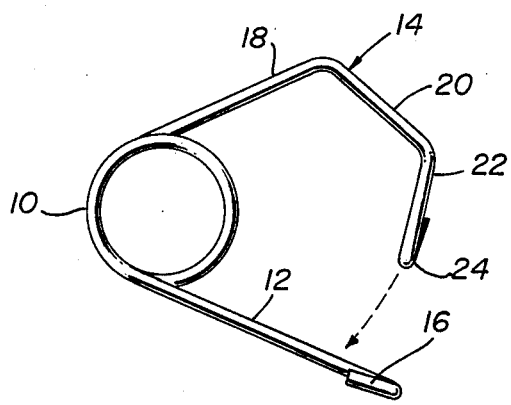
FIG. 4 is an enlarged plan view of a flag mounting clip of the invention.
Figure 5:
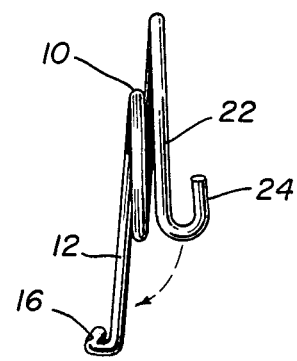
FIG. 5 is an end view of the clip of FIG. 4.

As an article of manufacture, a pair of clips 2 & 2a are packaged and sold together. Thus, while two clips are typically needed to hold any flag on a support, the combination of clips 2 & 2a enable a flag 4 to be mounted thereby said clips with them properly spaced apart for support of the flag on a tapered boat radio antenna 6 without use of any other mounting elements by placing the coil 10 of the clip 2 over the antenna followed by placing the coil 10a of the clip 2a over the antenna 6. In fact, the design of the new clips enables them to "lock on" to a tapered antenna. Thus, if clip 2 is first placed on the tapered antenna 6 in the opened mode (see FIG. 4), the lower grommet of flag 4 is slipped over the leg 14 and then leg 14 is hooked over leg 12, this causes the coil 10 to compress tightly about the antenna 6 and firm lock the clip 2 to the antenna 6. When clip 2a is similarly installed and attached to the flag 4, the flag is firmly locked onto the antenna and with the grommets of the flag properly spaced for proper display of the flag.

While the new clips are particularly useful for antenna mounting as just explained, they may be used for flag mounting on all conventional type flag supports, including haylards, staffs, flag poles, stays, and the like.

THE EMBODIMENTS OF THE INVENTION IN WHICH AN EXCLUSIVE PROPERTY OF PRIVILEGE IS CLAIMED ARE DEFINED AS FOLLOWS:

1. A clip for mounting a flag on a flag support formed of wire bent to define a circular coil from which first leg and a second leg tangentially extend, said first leg being substantially straight and terminating in a hooked end, said second leg consisting of first, second and third straight, integral sections of approximately equal length with said first section extending from said coil at an acute angle with respect to said first leg and with the distance between said first section and said first leg being greater than the diameter of said coil, said second section extends from said first section at a first angle with respect to said first section, said third section extends from said second section toward said first leg and at a second angle with respect to said second section terminating in a hooked end, said first and second angles being such that said hooked end of said third section may, by flexing of said coil, be hooked over said first leg at a point between its end and said coil with said third section positioned approximately normal to said first leg.

2. The clip of claim 1 in which said first and second angles are obtuse angles.

3. The clip of claim 1 wherein said coil is between about ¼ and 1 inch in diameter.

4. The clip of claim 3 wherein said first leg is between about ¾ and 2 inches in length.

5. The clip of claim 4 wherein said second leg is about 25 to 50% longer than said first leg.

6. As an article of manufacture, a package containing a first and second flag mounting clip, said first clip being formed of wire bent to define a circular coil from which a first leg and a second leg tangentially extend, said first leg being substantially straight and terminating in a hooked end, said second leg consisting of first, second and third straight, integral sections of approximately equal length with said first section extending from said coil at an acute angle with respect to said first leg and with the distance between said first section and said first leg being greater than the diameter of said coil, said second section extends from said first section at a first angle with respect to said first section, said third section extends from said second section toward said first leg and at a second angle with respect to said second section terminating in a hooked end, said first and second angles being such that said hooked end of said second section may, by flexing of said coil, be hooked over said first leg at a point between its end and said coil with said second section positioned approximately normal to said first leg, said second clip being formed of bent wire in substantially the same shape as said first clip, but with the coil thereof slightly smaller in diameter than the diameter of said coil of said first clip, the combination of said first and second clips enabling a flag to be mounted by said clips with them properly spaced apart for support of said flag on a tapered boat radio antenna without use of any other mounting elements by placing the coil of the first clip over the antenna followed by placing the coil of the second clip over the antenna.

* * * * *